(12) United States Patent
Butcher

(10) Patent No.: US 10,786,966 B2
(45) Date of Patent: Sep. 29, 2020

(54) ADDITIVE MANUFACTURED CONGLOMERATED POWDER REMOVAL FROM INTERNAL PASSAGES

(71) Applicant: UNITED TECHNOLOGIES CORPORATION, Hartford, CT (US)

(72) Inventor: Evan Butcher, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1127 days.

(21) Appl. No.: 14/874,621

(22) Filed: Oct. 5, 2015

(65) Prior Publication Data

US 2017/0095888 A1  Apr. 6, 2017

(51) Int. Cl.
| | | |
|---|---|---|
| *B32B 1/08* | (2006.01) | |
| *B22F 5/00* | (2006.01) | |
| *B22F 5/10* | (2006.01) | |
| *B22F 3/24* | (2006.01) | |
| *B33Y 40/00* | (2020.01) | |
| *B33Y 10/00* | (2015.01) | |
| *B33Y 80/00* | (2015.01) | |

(Continued)

(52) U.S. Cl.
CPC .............. *B32B 1/08* (2013.01); *B22F 3/1055* (2013.01); *B22F 3/24* (2013.01); *B22F 5/009* (2013.01); *B22F 5/10* (2013.01); *B23K 15/0086* (2013.01); *B23K 15/0093* (2013.01); *B23K 26/0006* (2013.01); *B23K 26/342* (2015.10); *B33Y 10/00* (2014.12); *B33Y 40/00* (2014.12); *B33Y 80/00* (2014.12); *B22F 2003/247* (2013.01); *B23K 2103/04* (2018.08); *B23K 2103/05* (2018.08); *B23K 2103/08* (2018.08); *B23K 2103/10* (2018.08); *B23K 2103/14* (2018.08); *B23K 2103/18* (2018.08); *B23K 2103/52* (2018.08); *Y02P 10/295* (2015.11)

(58) Field of Classification Search
CPC ..... F16L 9/12; F16L 9/127; F16L 9/14; F16L 9/19; F16L 9/20; F16L 9/22; F16L 11/00; F16L 11/04; F16L 11/14; F16L 11/20; F16L 11/22; B32B 1/08
See application file for complete search history.

(56) References Cited

U.S. PATENT DOCUMENTS

| 6,995,334 B1 | 2/2006 | Kovacevic et al. |
|---|---|---|
| 7,777,155 B2 | 8/2010 | Twelves, Jr. et al. |

(Continued)

FOREIGN PATENT DOCUMENTS

| EP | 3053676 A1 | 8/2016 |
|---|---|---|
| EP | 3069805 A2 | 9/2016 |
| GB | 2517490 A | 2/2015 |

OTHER PUBLICATIONS

European Extended Search Report dated Feb. 22, 2017, issued in the corresponding European Patent Application No. 16192465.9.

*Primary Examiner* — Walter Aughenbaugh
(74) *Attorney, Agent, or Firm* — Bachman & LaPointe, P.C.

(57) ABSTRACT

A component includes an additively manufactured component with an internal passage and an additively manufactured elongated member within the internal passage. A method of additively manufacturing a component including additively manufacturing a component with an internal passage; and additively manufacturing an elongated member within the internal passage concurrent with additively manufacturing the component.

7 Claims, 3 Drawing Sheets

(51) Int. Cl.
  B23K 26/342 (2014.01)
  B22F 3/105 (2006.01)
  B23K 15/00 (2006.01)
  B23K 26/00 (2014.01)
  *B23K 103/04* (2006.01)
  *B23K 103/08* (2006.01)
  *B23K 103/10* (2006.01)
  *B23K 103/14* (2006.01)
  *B23K 103/18* (2006.01)
  *B23K 103/00* (2006.01)

(56) References Cited

U.S. PATENT DOCUMENTS

| | | |
|---|---|---|
| 8,383,985 B2 | 2/2013 | Twelves, Jr. et al. |
| 8,488,994 B2 | 7/2013 | Hanson et al. |
| 8,506,836 B2 | 8/2013 | Szuromi et al. |
| 8,718,522 B2 | 5/2014 | Chillscyzn et al. |
| 8,879,957 B2 | 11/2014 | Hanson et al. |
| 8,961,167 B2 | 2/2015 | Swanson et al. |
| 8,985,497 B2 | 3/2015 | Mannella et al. |
| 8,994,592 B2 | 3/2015 | Scott et al. |
| 9,023,566 B2 | 5/2015 | Martin |
| 9,023,765 B1 | 5/2015 | Rimmer et al. |
| 9,029,058 B2 | 5/2015 | Martin |
| 9,039,917 B2 | 5/2015 | Szuromi et al. |
| 9,050,753 B2 | 6/2015 | Rodgers et al. |
| 9,050,788 B2 | 6/2015 | Swanson et al. |
| 9,073,263 B2 | 7/2015 | Mannella et al. |
| 9,079,803 B2 | 7/2015 | Xu |
| 9,114,478 B2 | 8/2015 | Scott et al. |
| 9,120,270 B2 | 9/2015 | Chen et al. |
| 2006/0118532 A1 | 6/2006 | Chung et al. |
| 2012/0107496 A1 | 5/2012 | Thoma |
| 2014/0084583 A1* | 3/2014 | Hemingway ....... B29C 67/0059 285/374 |

* cited by examiner

ADDITIVE MANUFACTURED CONGLOMERATED POWDER REMOVAL FROM INTERNAL PASSAGES

BACKGROUND

The present disclosure relates to additive manufacturing and, more particularly, to removing conglomerated powder from within an internal passage.

Precision engineered parts such as gas turbine components may be manufactured by an additive manufacturing operation such that features associated with conventional manufacturing processes, e.g., machining, forging, welding, casting, etc. can be eliminated to facilitate savings in cost, material, and time. Additive manufacturing often results in conglomerated powder building-up around, and within, the completed component as an artifact of the process. When additive manufacturing a component that has internal passages, this conglomerated powder often becomes entrapped in the internal passages and is difficult to remove.

There are currently few methods that directly and rapidly remove the conglomerated powder. One standard practice may include repeated use of an accelerated media blast, combined with mechanically scraping. Another standard practice includes, mega sonic or ultrasonic vibratory methods to liberate the powder particles. Oftentimes, such practices are still inefficient at removal of removing conglomerated powder from within the internal passages.

SUMMARY

A component according to one disclosed non-limiting embodiment of the present disclosure can include an additively manufactured component with an internal passage; and an additively manufactured elongated member within the internal passage.

A further embodiment of the present disclosure may include, wherein the additively manufactured component include a first flange, a second flange, and a conduit with the internal passage therebetween.

A further embodiment of any of the embodiments of the present disclosure may include, wherein the conduit includes multiple bends.

A further embodiment of any of the embodiments of the present disclosure may include, wherein the internal passage is non line of sight.

A further embodiment of any of the embodiments of the present disclosure may include, wherein the additively manufactured elongated member defines a maximum diameter that forms an about 0.01 inch radial gap with the internal passage.

A further embodiment of any of the embodiments of the present disclosure may include, wherein the additively manufactured elongated member extends along a centerline of the internal passage.

A further embodiment of any of the embodiments of the present disclosure may include, wherein the internal passage defines an aspect ratio with a diameter to length of less that 1:4.

A further embodiment of any of the embodiments of the present disclosure may include, wherein a ratio between the internal passage internal diameter and the elongated member outer diameter is between 1.005:1 to 25:1.

A further embodiment of any of the embodiments of the present disclosure may include, wherein a diameter of the elongated member is greater than about 0.03 inches and less than a maximum diameter that forms an about 0.01 inch radial gap with the internal passage.

A further embodiment of any of the embodiments of the present disclosure may include, wherein the internal passage is between about 0.25 and 2.0 inches (~6-50 mm) in diameter.

A method of additively manufacturing a component according to one disclosed non-limiting embodiment of the present disclosure can include additively manufacturing a component with an internal passage; and additively manufacturing an elongated member within the internal passage concurrent with additively manufacturing the component.

A further embodiment of any of the embodiments of the present disclosure may include cleaning the internal passage of conglomerated powder with the elongated member subsequent to completion of the additively manufacturing.

A further embodiment of any of the embodiments of the present disclosure may include removing the elongated member from within the internal passage subsequent to cleaning the internal passage.

A further embodiment of any of the embodiments of the present disclosure may include destructively removing the elongated member from within the internal passage subsequent to cleaning the internal passage.

A further embodiment of any of the embodiments of the present disclosure may include pulling the elongated member out of the internal passage subsequent to cleaning the internal passage.

A further embodiment of any of the embodiments of the present disclosure may include removing conglomerated powder from the external surfaces of the completed additively manufactured component.

A further embodiment of any of the embodiments of the present disclosure may include agitating the elongated member within the internal passage to remove clean the internal passage of conglomerated powder of the completed additively manufactured component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
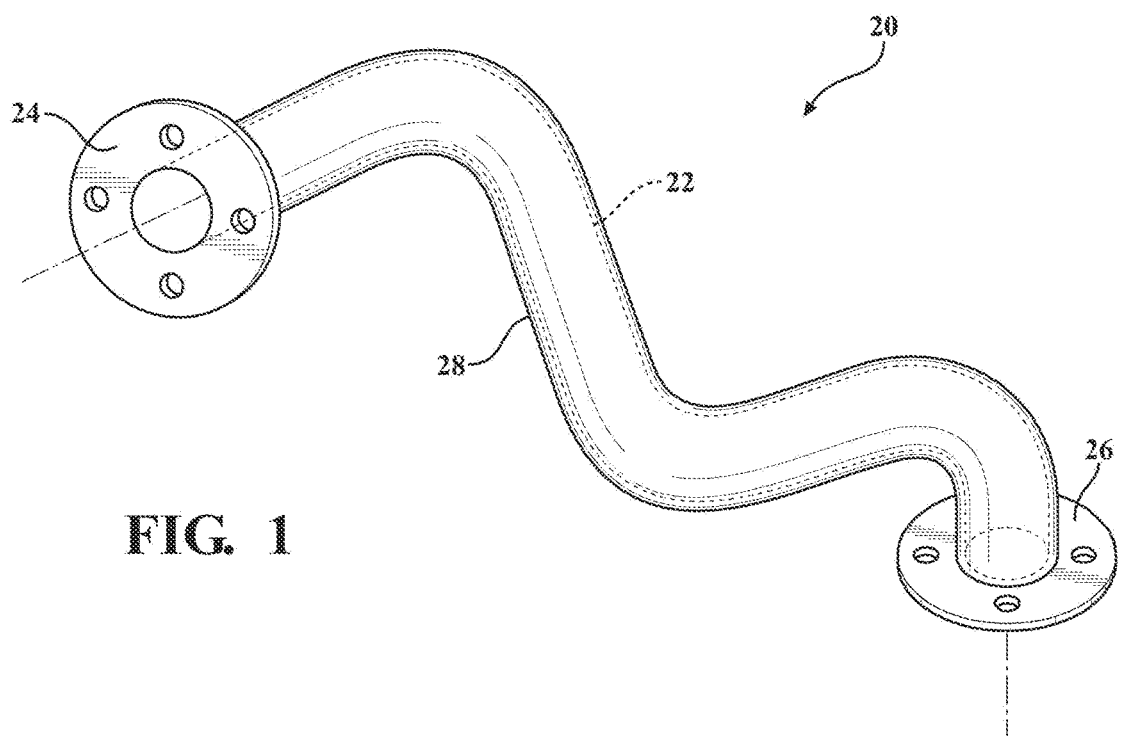
FIG. 1 is a perspective view of a representative additively manufactured component.

FIG. 1 schematically illustrates a component 20 that includes an internal passage 22. In this example, the component 20 may be a conduit such as that of a manifold, duct, flow passage, or other such component. The component 20 may include a first flange 24, a second flange 26, and a conduit 28 with the internal passage 22 therebetween. The internal passage 22 may be complex and be of a non-line of sight geometry that includes multiple bends. It should be appreciated that various additional or alternative segments and/or fittings may also be provided. It should be further appreciated that although a conduit type example is illustrated herein, other aerospace components, aircraft structures, as well as a wide variety of applications outside the aerospace industry, which include one or more internal passages, will benefit herefrom.

The component 20 may be readily manufactured with an additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, those skilled in the art of manufacturing will recognize that any other suitable rapid manufacturing methods using layer-by-layer construction or additive fabrication can alternatively be used.

The additive manufacturing process sequentially builds-up layers of atomized alloy and/or ceramic powder material that include but are not limited to, steel alloys, stainless steel alloys, titanium alloys, nickel alloys, aluminum alloys and others in atomized powder material form. Nickel alloys may have specific benefit for parts that operate in high temperature environments, such as, for example, environments typically encountered by aerospace and gas turbine engine components.

The additive manufacturing process fabricates or "grows" of components using three-dimensional information, for example a three-dimensional computer model. The three-dimensional information is converted into a plurality of slices, each slice defining a cross section of the component for a predetermined height of the slice. The additive manufactured component 20 is then "grown" slice-by-slice, or layer-by-layer, until finished. Each layer has an example size between about 0.0005-0.001 inches (0.0127-0.0254 mm). The additive manufacturing process facilitates manufacture of the relatively complex internal passage geometry to minimize assembly details, gun-drilling, and multi-component construction.

Figure 3:
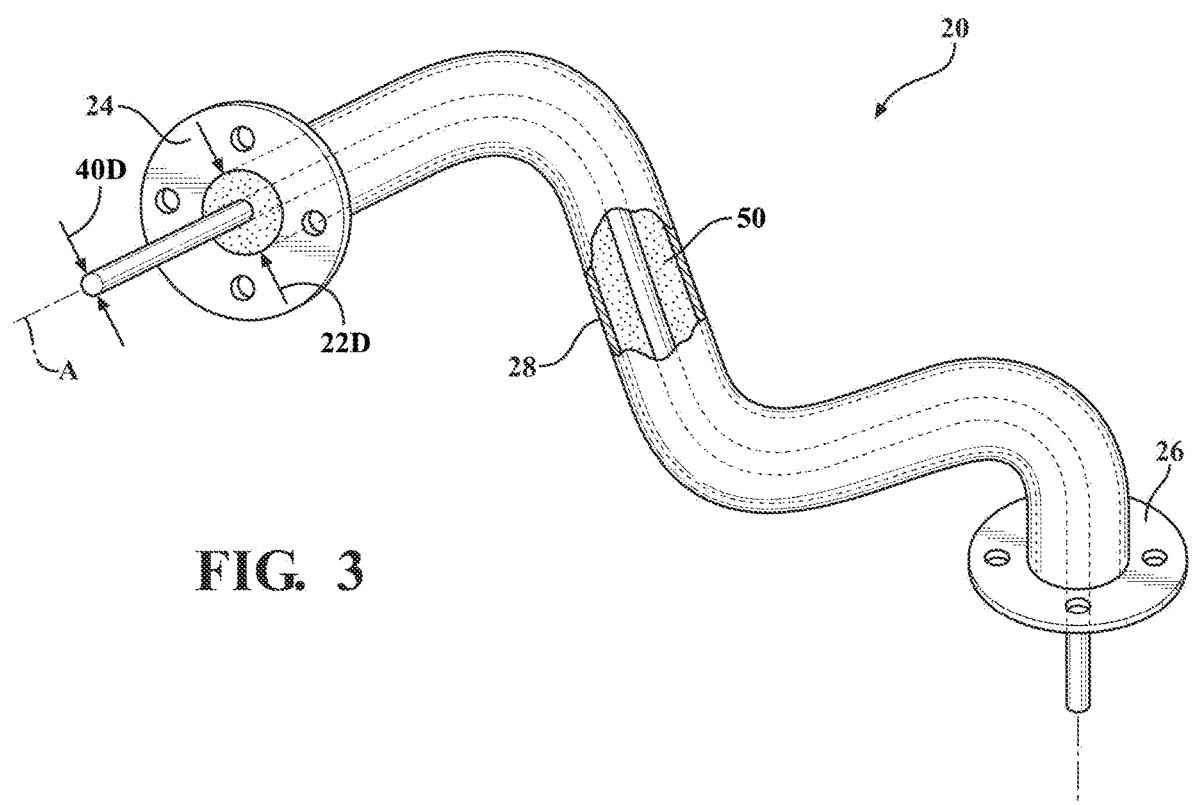
FIG. 3 is a perspective view of the additively manufactured component of FIG. 1 with an elongated member for removing conglomerated powder from within an internal passage.
Figure 2:
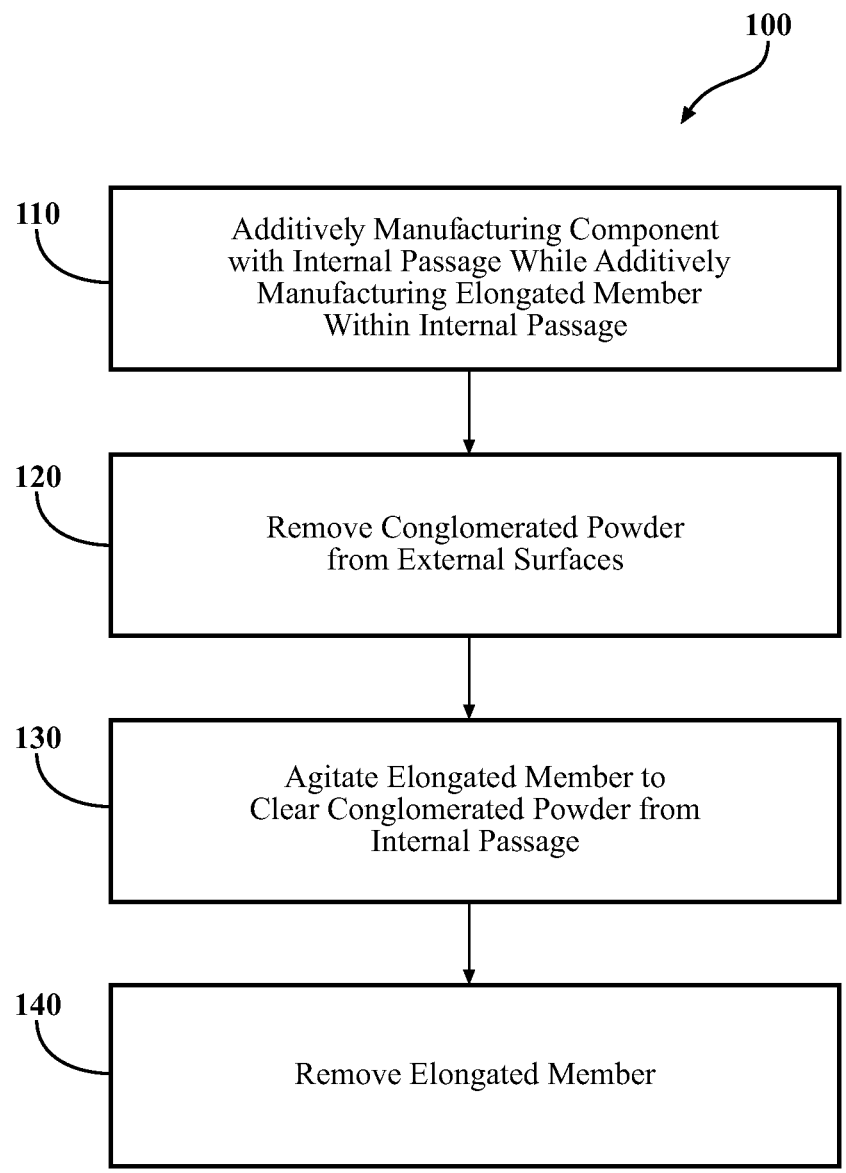
FIG. 2 is a method of additively manufacturing a component according to one disclosed non-limiting embodiment.

With reference to FIG. 2, one disclosed non-limiting embodiment of a method 100 to additively manufacture the component 20 initially includes additively manufacturing the component 20 with an elongated member 40 through the internal passage 22 (step 110; FIG. 3). That is, the elongated member 40 forms no part of the component 20 but is additively manufactured simultaneously with the component 20. The elongated member 40 may be integral to the build geometry and may follow along a centerline A of the internal passage 22.

In one embodiment, the internal passage 22 may define an aspect ratio with a diameter to length of less that 1:4. In one non-limiting dimension embodiment, the elongated member 40 diameter 40D is greater than a minimum diameter of about 0.03 inches in and less than a maximum diameter that forms an about 0.01 inch radial gap with the internal passage 22. In this non-limiting dimension embodiment, the internal diameter 22D dimension of the internal passage 22 is between about 0.25 and 2.0 inches (~6-50 mm) in diameter. For example, for an internal diameter 22D of 2.0 inches, the diameter 40D may be between about 0.03-1.98 inches. In the non-limiting dimension embodiment, the ratio between the internal diameter 22D and the outer diameter 40D is between about 1.005:1 to 12.525:1. It should be appreciated that this is but one example, and various relationship may otherwise benefit herefrom.

Figure 4:
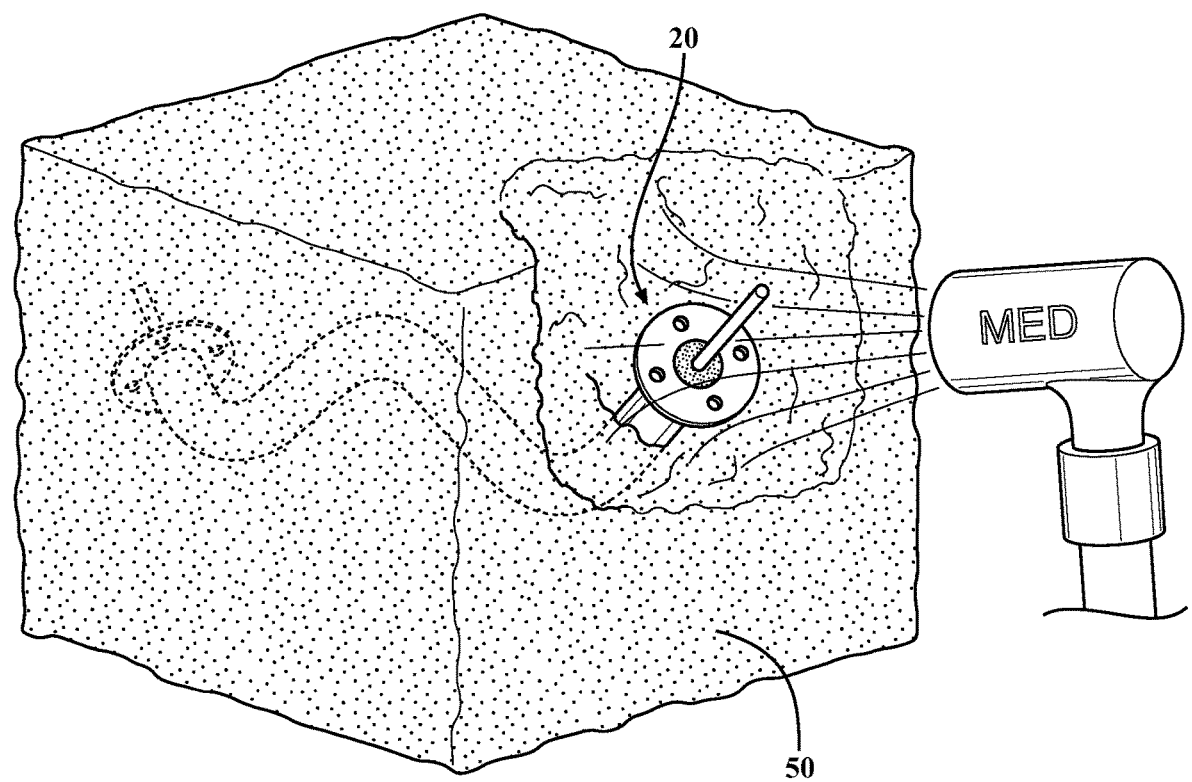
FIG. 4 is a perspective view of the additively manufactured component with the conglomerated powder.

Next, conglomerated powder 50 is removed from the external surfaces of the completed additively manufactured component 20 (step 120; FIG. 4). Removal is conventional and may include the use of accelerated media blast, mechanically scraping, vibratory or other methods. The completed component 20 thereby retains the elongated member 40 within the internal passage 22 once the conglomerated powder 50 is removed from the external surfaces. The elongated member 40 may be utilized to facilitate handling and transport of the component 20.

Next, the elongated member 40 is agitated and/or "stirred" around inside the internal passage 22 to mechanically work the conglomerated powder 50 out of the internal passage 22 (step 130). That is, the conglomerated powder 50 may be relatively compacted and the elongated member 40 operates to clean the internal passage 22 of the conglomerated powder 50. As the elongated member 40 generally extends along the centerline A of the internal passage 22, the entirety of the internal passage 22 is readily cleared. Alternatively, the elongated member 40 may almost completely fill the internal passage 22 to facilitate the removal of a relatively large volume of conglomerated powder 50 in addition to breaking up the conglomerated powder 50.

Next, the elongated member 40 is removed from the internal passage 22 (step 140; FIG. 1). In some instances the elongated member 40 is sufficiently flexible and the internal passage geometry is such that the elongated member 40 may be pulled out from the internal passage 22. In other instances, the elongated member 40 may need to be destructively removed such as via abrasive flow, chemical milling, and/or other processes.

The utilization of the elongated member 40 readily facilitates direct and rapid removal of the conglomerated powder from within internal passages.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A component, comprising:
an additively manufactured component with a non-line of sight internal passage; and
a removable additively manufactured elongated member that extends through the non-line of sight internal passage, the additively manufactured elongated member defines a maximum diameter that forms an about 0.01 inch radial gap with the non-line of sight internal passage, wherein a ratio between the non-line of sight internal passage internal diameter and the elongated member outer diameter is between 1.005:1 to 25:1, the area between the non-line of sight internal passage internal diameter and the removable additively manufactured elongated member outer diameter filled with conglomerated powder.

2. The component as recited in claim 1, wherein the additively manufactured component comprises a first flange, a second flange, and a conduit with the internal passage therebetween.

3. The component as recited in claim 2, wherein the conduit includes multiple bends.

4. The component as recited in claim 1, wherein the additively manufactured elongated member extends along a centerline of the internal passage.

5. The component as recited in claim 1, wherein the internal passage defines an aspect ratio with a diameter to length of less than 1:4.

6. The component as recited in claim 1, wherein a diameter of the elongated member is greater than about 0.03 inches.

7. The component as recited in claim 1, wherein the internal passage is between about 0.25 and 2.0 inches (~6-50 mm) in diameter.

* * * * *